(12) United States Patent
Gottifredi et al.

(10) Patent No.: US 8,432,850 B2
(45) Date of Patent: Apr. 30, 2013

(54) METHOD OF SYNCHRONISING NODES OF A NETWORK, AND SYSTEM AND DEVICE THEREFOR

(75) Inventors: Franco Gottifredi, Rome (IT); Monica Gotta, Rome (IT)

(73) Assignee: Thales Alenia Space Italia, S.p.A., Rome (IT)

( * ) Notice: Subject to any disclaimer, the term of this patent is extended or adjusted under 35 U.S.C. 154(b) by 358 days.

(21) Appl. No.: 12/744,548

(22) PCT Filed: Dec. 15, 2008

(86) PCT No.: PCT/EP2008/067574
§ 371 (c)(1),
(2), (4) Date: Jun. 4, 2010

(87) PCT Pub. No.: WO2009/077512
PCT Pub. Date: Jun. 25, 2009

(65) Prior Publication Data
US 2010/0245172 A1    Sep. 30, 2010

(30) Foreign Application Priority Data
Dec. 18, 2007  (EP) .................................. 07425796

(51) Int. Cl.
*H04B 7/212* (2006.01)
(52) U.S. Cl.
USPC ......................................................... 370/324

(58) Field of Classification Search .................. 370/338, 370/324, 332
See application file for complete search history.

(56) References Cited

U.S. PATENT DOCUMENTS

| 4,142,069 | A | * | 2/1979 | Stover ........................... 370/507 |
| 5,363,375 | A | | 11/1994 | Chuang et al. |
| 5,621,646 | A | * | 4/1997 | Enge et al. ..................... 701/120 |
| 6,570,534 | B2 | * | 5/2003 | Cohen et al. ............. 342/357.29 |
| 7,292,185 | B2 | * | 11/2007 | Whitehead et al. ....... 342/357.36 |
| 2008/0183894 | A1 | * | 7/2008 | Rai et al. ....................... 709/248 |

FOREIGN PATENT DOCUMENTS

| WO | 01/61426 A2 | 8/2001 |
| WO | 2006/097880 A1 | 9/2006 |

* cited by examiner

*Primary Examiner* — Mark Rinehart
*Assistant Examiner* — Mohammad Anwar
(74) *Attorney, Agent, or Firm* — Baker Hostetler LLP

(57) ABSTRACT

A method of and a system for synchronizing a plurality of spaced apart nodes of a network to a reference time of a control center, the method comprising receiving measurement data from each of the plurality of nodes; ranking the plurality of nodes with respect to one another according to the measurement data; selecting one or more master nodes from the plurality of nodes according to the ranking; assigning each of the plurality of nodes to a corresponding master node; determining a first time offset between the local time measured at each node and the local time measured at its corresponding master node and determining a second time offset between each of the master nodes and the reference time such that the time offset between the local time measured at each node and the reference time can be determined.

14 Claims, 11 Drawing Sheets

METHOD OF SYNCHRONISING NODES OF A NETWORK, AND SYSTEM AND DEVICE THEREFOR

CROSS-REFERENCE TO RELATED APPLICATIONS

This application is a National Stage of International patent application PCT/EP2008/067574, filed on Dec. 15, 2008, which claims priority to foreign European patent application No. EP 07425796.5, filed on Dec. 18, 2007, the disclosures of which are incorporated by reference in their entirety.

FIELD OF THE INVENTION

The present invention relates to a method of synchronising nodes of a network. Particularly, but not exclusively, the invention relates to a method of synchronising mutually spaced nodes of a network to a reference timescale based on Global Navigation Satellite Systems (GNSS). The invention further relates to a synchronisation device and a synchronisation system for synchronising mutually spaced nodes of a network to a reference timescale based on Global Navigation Satellite Systems (GNSS).

BACKGROUND OF THE INVENTION

Synchronising nodes of a network with respect to a system reference time is an important requirement in many networking applications. A central issue in designing complex networked systems for critical applicative domains is the possibility of keeping each node of the network synchronized with respect to a given system time scale. The problem becomes even more critical when the communication links between nodes cannot be directly exploited to achieve system wide synchronization.

High performance synchronization, to the order of nanoseconds and picoseconds, is a fundamental requirement in many domains of application. For example, such synchronisation may be required in sectors such as positioning, localization and range based applications, complex monitoring and control systems spanning wide inter-node baselines, financial transactions, distributed production lines, environmental monitoring systems for Safety of Life (SoL) and civil protection applications and, in general, to any heavily loaded, time-tagging based distributed system.

Network synchronisation should take into account system requirements in terms of performance and required functionalities, such as for example:
  Network Criticality Level: i.e. low (e.g. normal robustness and not life critical), medium (e.g. high robustness but not life critical) or high (e.g. SoL Networks);
  Network Coverage Level (considering the major axis of the network envelope): Small (<300 km), Medium (<5000 km) or High (>5000 km);
  Network Security Level: Open (e.g. scientific applications), medium (e.g. only security only on communication layer), or secure (e.g. different levels of security such as data, communication, . . . );
  Network Complexity Level: Simple/Medium (no slow and un-reliable communication links), or Complex (e.g. heterogeneous networks).

The variety and number of different requirements has led to problems providing a unique synchronization system capable of coping with any need. Instead, such synchronization has to be provided by ad-hoc type systems targeted to the desired solution.

There have been various developments in the field of synchronisation. A number of timing systems are based on navigation signals from GNSS satellite systems such as GLONASS, GPS and the future Galileo satellite system. It will be appreciated that the term GNSS may also refer to all similar satellite navigation type systems including ground based transmitters arranged to emit navigation signals. Navigation signals are ideal for synchronisation applications since they are generated from very stable sources and the location of the transmitters is precisely known. Furthermore, the signals transmitted by GNSS Satellites have a world-wide coverage and are referred to a common global time reference. Navigation signals are generally used in the form of pseudo-ranges, which result from a correlation process, internal to the receivers, between the GNSS Satellites transmitted Pseudo-Random Noise (PRN) code, of finite length modulated on the carrier, and the replica generated inside the received signal. The PRN code spectral properties (i.e. spread spectrum) have made it an ideal signal for ranging applications. Pseudo-range measurements are, however, limited in accuracy by bandwidth and signal-to-noise ratio to the order of meters. Even for a differential system, where propagation delays can be removed, this is clearly insufficient for high-precision time transfer applications.

International Patent Application WO 01/61426 describes a method and apparatus having multiple GNSS receivers positioned at mutually remote locations. Each GNSS receiver is connected to a central processor system which calculates the offsets between the various GPS receiver time signals. A drawback of the described system is that each GPS receiver needs to be connected to the central processor system and that the computing load and data load of the central processor system increase significantly as the number of receivers in the network increases. Furthermore, the time synchronization computation is made on the time estimated by each receiver thereby including any error affecting the Navigation Solution for position determination (e.g. errors in position are transferred to errors in time determination).

SUMMARY OF INVENTION

The present invention sets out to address the aforementioned problems.

In general terms, the invention sets out to provide a method of and a system for synchronising nodes of a network using GNSS signals by providing a configurable distributed network in which the computing and data load can be distributed from a central processor to one or more master processors. The invention further sets out to provide flexible and scalable network performance and coverage in order to cope with different needs and network topologies.

According to a first aspect of the invention, there is provided a method of synchronising a plurality of spaced apart nodes of a network to a time reference of a control centre. The method comprises receiving measurement data from each of the plurality of nodes; ranking the plurality of nodes according to the measurement data; selecting one or more master nodes from the plurality of nodes according to the ranking; assigning each of the plurality of nodes to a corresponding master node or to the control centre; and determining a first time offset between the local time measured at each node and the local time measured at its corresponding master node and determining a second time offset between each of the master nodes and the reference time such that the time offset between the local time measured at each node and the reference time can be determined.

Accordingly, the computing and data load required for accurate synchronisation can be distributed from the control server to a number of master nodes resulting in a significant reduction in computing and data load at the control centre. Moreover, more accurate synchronisation can be achieved since the distance between a master node and its allocated network node will be shorter than the distance between that node and the control centre considering that synchronization performance decreases with distance.

The measurement data may comprise one or more of the following: positional data representative of the geographical position of each node, environmental data representative of the local environmental conditions (such as, for example local weather and electromagnetic conditions) around each node; and performance data representative of the performance of each node (such as for example, the performance of the local clock at each node).

Positional data may comprise data correspond to measurements made by a GNSS receiver at the corresponding node. For example, a GNSS receiver may compute a pseudorange by measuring the time of arrival of a GNSS signal with respect to the time of transmission of the same signal.

Accordingly, each node may be ranked according to the geographical position of that node with respect to neighbouring network nodes. For example, a more centrally located network node with respect to other network nodes can be given a higher ranking than a node which is less centrally located. Other factors having an effect on the selection of master nodes may be taken into account such as the spreading of the nodes or the mobility of the nodes having an effect on the network topology.

Further, the nodes may be ranked according to the performance of each node, for example the performance of the clock at each node. In this way, nodes having a more stable reference time in comparison to neighbouring nodes can be selected from among those nodes as a master node.

Other factors that may be considered in the ranking of the nodes, can be related to: local environmental factors in the vicinity of the node having an effect on satellite signal performance and, therefore, on the measurement data of the node; network link characteristics of the node having an effect on the availability of the measurement data, collected by the node, at the master node.

The geographical distribution of the nodes can be determined according to the positional data and each of the plurality of nodes can be assigned to a corresponding master node according to the position of the node relative to the position of a master node. The control centre may play the role of a master node and one or more nodes may be assigned to the control centre.

The invention thereby provides flexibility since synchronisation will not depend on the network topology by virtue of the control centre characterising the network itself. Thus, the method may be adapted to any network and easily applied to existing networks.

Observable data such as data representative of pseudo range and/or carrier phase measurements may be received from the plurality of nodes.

The first time offset between a node and its corresponding master node, or the second time offset between the control centre and each master node, may be determined by applying an algorithm selected from the group of common view time transfer, linked common view time transfer and multiple path linked common view time transfer algorithms. The synchronisation algorithm may be automatically selected by the control centre or a master node according to the position of the node with respect to its corresponding master node. Thus, scalability is provided since the method can be adapted to the relative node distance by selecting the appropriate synchronisation algorithm.

The first time offset between a node and its corresponding master node, or the second time offset between a master node and the control centre may be determined by applying a carrier phase algorithm. In this way the synchronisation can attain high accuracy to the order of picosecond.

The clock performance of each node may be monitored in order to rerank the nodes according to clock performance and to select a node as a master node according to the ranking. Continuous monitoring of node performance in this way provides fault tolerance and recovery, and resilience. A master reference node can be automatically substituted by another node in the event of a failure without the overall synchronisation process of other network nodes being affected.

Updated positional information may be received from the nodes of the network and a master node can be selected from a plurality of nodes according to the updated positional information. If, for example, a mobile node moves from one area to another area, the method can, where appropriate, reallocate that node to a more suitable master node in terms of position, i.e. move it from one sub-network to another sub-network. Further, if a master node moves away from its allocated nodes, a more suitable replacement master node may be found for those nodes.

According to a second aspect of the invention there is provided a synchronisation device for synchronising a plurality of nodes of a network with a reference time scale, the device comprising: a GNSS receiver operatively associated with a GNSS antenna; a time source giving local time; data communication means for receiving data from and/or transmitting data to one or more of the nodes; ranking means operable to rank the nodes with respect to one another according to the measurement data transmitted by the nodes; selection means operable to select one or more master nodes from the plurality of nodes according to the ranking of the nodes; assigning means operable to assign each of the plurality of nodes to a corresponding master node or to a control centre according to the measurement data received from each node; and time offset determination means operable to determine a first time offset between the local time measured at each node and the local time measured at its corresponding master node and operable to determine a second time offset between each of the master nodes and the reference time scale such that the time offset between the local time measured at each node and the reference time scale can be determined.

According to a third aspect of the invention, there is provided a synchronisation system for synchronising a plurality of nodes of a network with a reference time scale, the device comprising a synchronisation device as previously described and a plurality of network nodes, the network nodes each being equipped with a GNSS receiver and a local timing source.

BRIEF DESCRIPTION OF THE DRAWINGS

Embodiments of the invention will now be described, by way of example only, and with reference to the following drawings in which:—

DETAILED DESCRIPTION

Figure 1A:
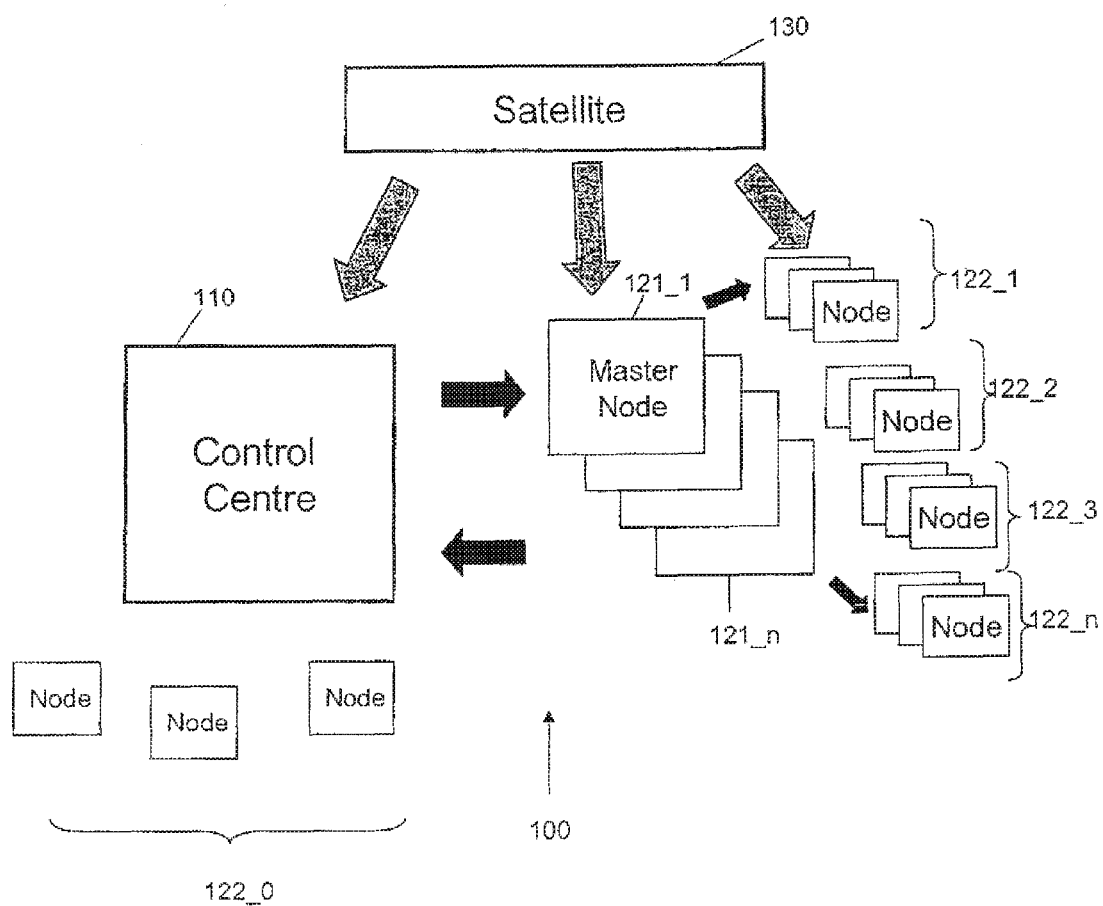
FIG. 1A is a schematic diagram of a synchronisation system according to a first embodiment of the invention.
Figure 1B:
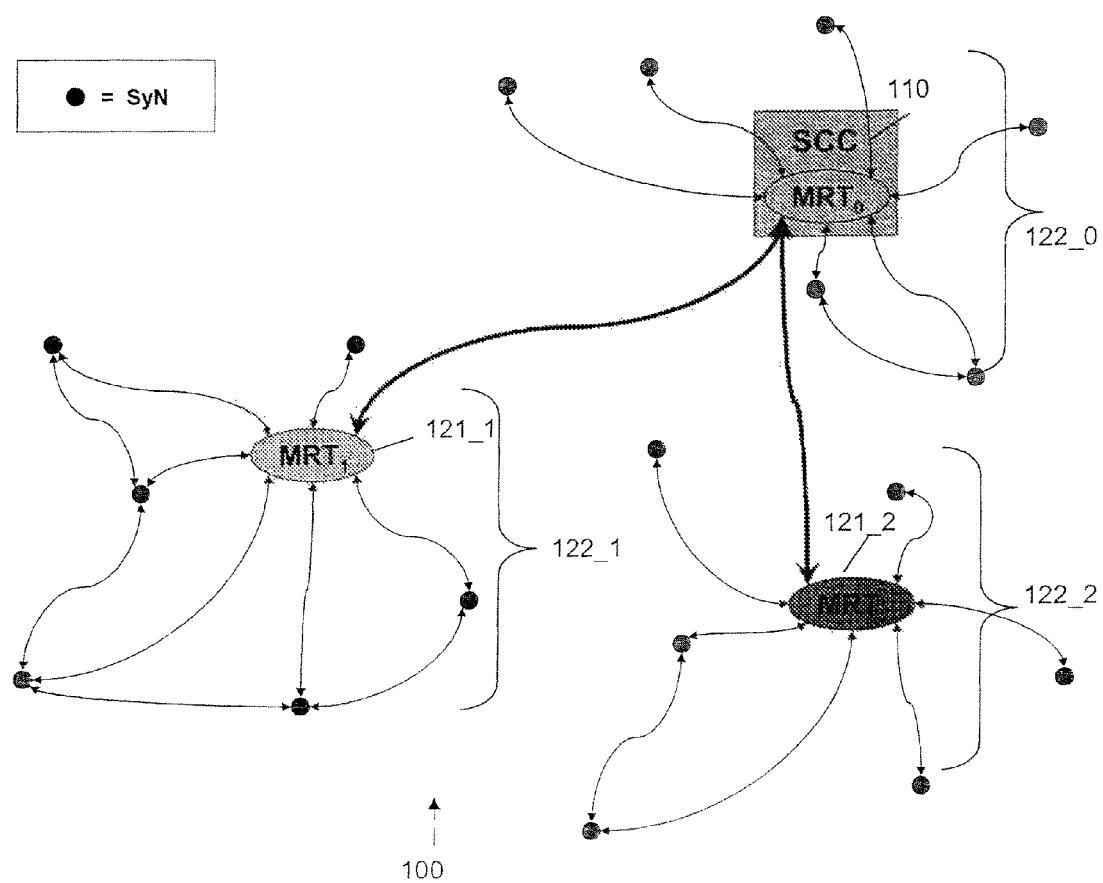
FIG. 1B is a diagram illustrating the layout of the network nodes of FIG. 1.

A first embodiment of the invention will now be described with reference to FIGS. 1 to 4. FIGS. 1A and 1B illustrate a system 100 for synchronising nodes of a network to a reference timescale according to the first embodiment of the invention. The system comprises a control centre 110 having a reference timescale, n spatially separated master nodes 121-1 to 121-$n$, and $m$ network nodes in groups 122_0, 122_1, 122_2 ... 122_$n$, a GNSS satellite system 130, such as a GPS, GLONASS, GALILEO or COMPASS satellite system, comprising a plurality of satellites for providing positioning signals to control centre 110 and the nodes 121, 122 of the network.

Figure 2:
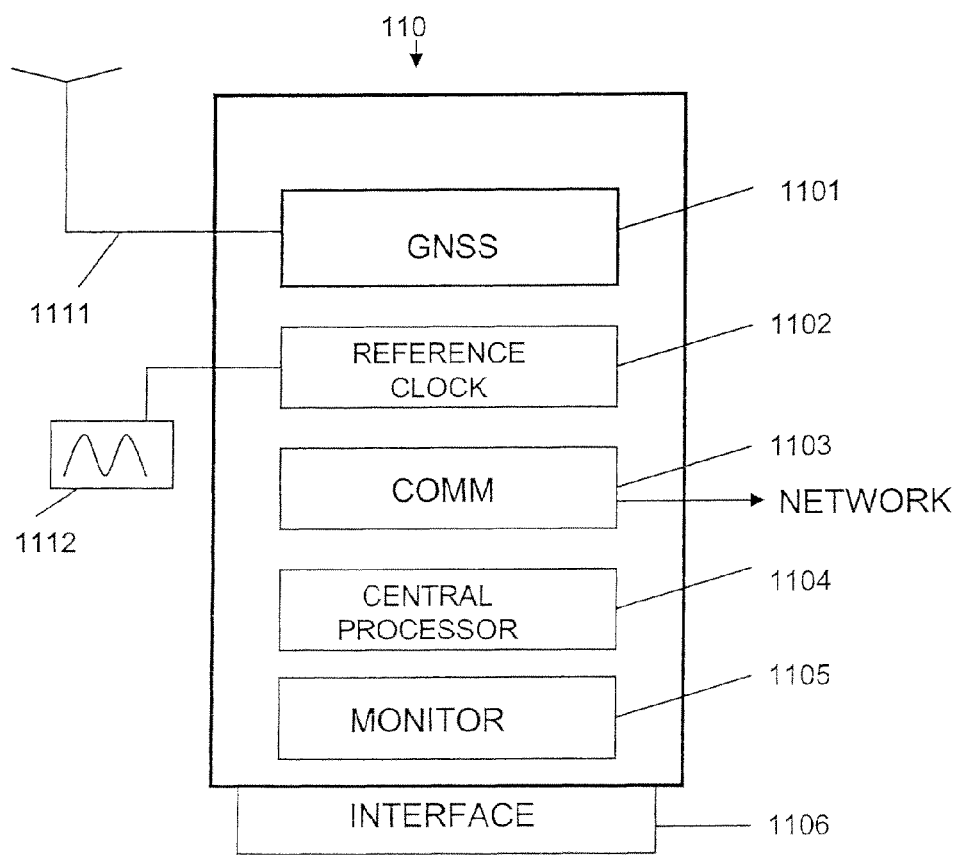
FIG. 2 is a schematic diagram of a control centre device according to the first embodiment of the invention.

The control centre 110 will now be described in more detail with reference to FIG. 2. Control centre 110 includes a multi frequency (at least dual frequency) GNSS receiver 1101 operatively associated with a GNSS antenna 1111 for receiving navigation signals from any of the satellites of GNSS satellite system 130 in view of the GNSS antenna 1111, the GNSS receiver 1101 being capable of Coarse Acquisition (C/A) code and carrier phase measurements, a central reference clock 1102 giving a time and frequency reference, communication link 1103 for transmitting and/or receiving data to and from nodes of the network including master nodes 121_1-121_$n$ and network nodes 122_0 to 122_$n$, a central processor 1104 and an application interface 1105 for interfacing with the application layer requiring synchronisation. Such an application may include a positioning, localization or range based application. Alternatively, the application may include any time-tagging system such as complex monitoring and control systems which can span wide inter-node baselines, financial transactions, distributed production lines and environmental monitoring systems for SoL and civil protection applications Reference clock 1102 includes a high stability atomic oscillator 1112 to which it is locked. High stability is required both on a long term and on a mid/short term basis. Such stability is achieved with the use of a clock ensemble composed of an Active Hydrogen Maser clock, for short term stability, and Cesium or Rubidium clocks for long term stability.

The control centre 110 further includes an environmental monitor 1106 comprising a meteo station for monitoring weather conditions, a water vapour radiometer for monitoring the local environmental conditions having an influence on the atmosphere and, an electro-magnetic environment monitoring system for monitoring the local EM pollution having an influence on the signal performance and consequently the measurement performed by the GNSS receiver 1101 of the GNSS satellite 130 signal.

Central processor 1104 is operable to monitor the status of the nodes of the network including parameters such as node clock performance, to configure the network by selecting master nodes 121_1 to 121_$n$ from the nodes of the network and to allocate each node 122_0 to 122_$n$ to a respective master node 121_1-121_$n$ or to the control centre 110 according to the data received from each node. The data received by the control centre 110 from each node includes data representative of the performance of the clock at each node, the environmental conditions of each node and the positional data of each node. The central processor 110 is also configured to store and/or to implement synchronisation algorithms including common view time transfer (CVTT), Linked Common View Time Transfer (LVCTT) and multiple-path linked common view time transfer (MLCVTT), pseudo range and carrier phase algorithms according to the range of the network and the required level of synchronisation. The algorithms can be implemented at the control centre and/or at the MRTs.

As mentioned above, the role of control centre 110 includes configuring the network in terms of selecting a number of master nodes 121_1 to 121_$n$ from all of the network nodes, allocating each network node 122_0 to 122_$n$ to a master node 121_1 to 121_$n$ or to the control centre 110 according to the positional data, synchronising the master nodes and the nodes allocated to the control centre 110 to the reference time scale of the control centre 110. In some cases the role of the control centre may include selecting a synchronisation algorithm for each master node according to the configuration of the master node 121_$x$ and its respective allocated nodes 122_$x$.

Figure 3:
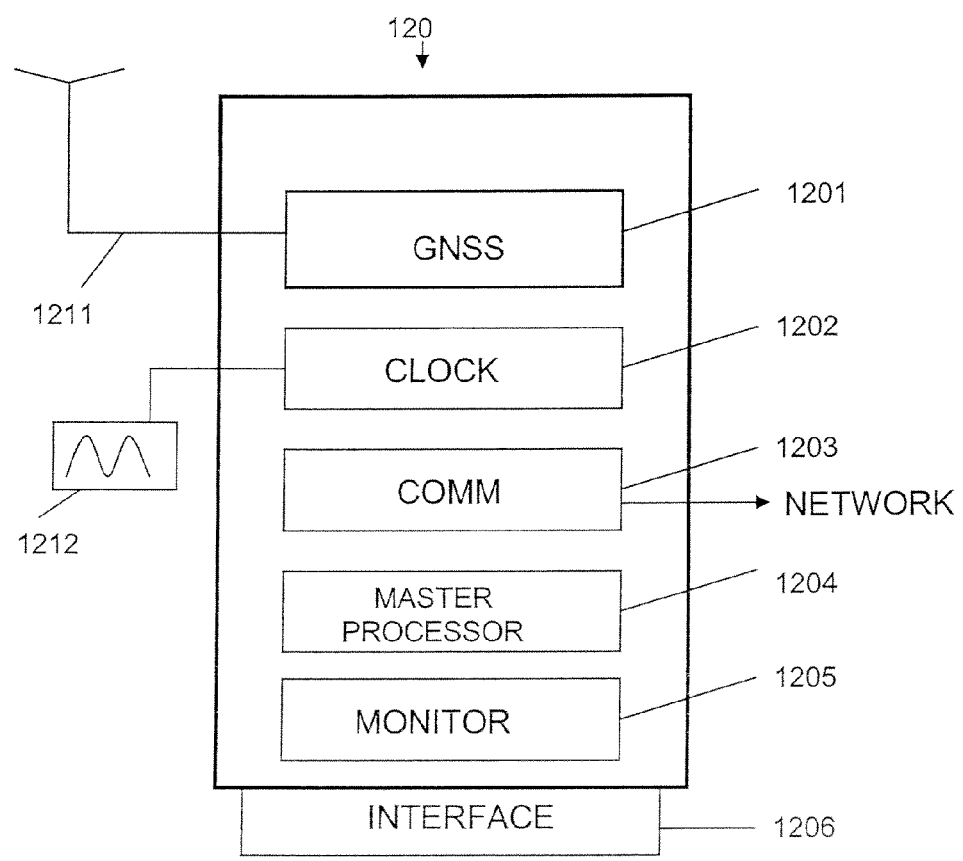
FIG. 3 is a schematic diagram of a master node device according to the first embodiment of the invention.

A master node 121 will now be described in more detail with reference to FIG. 3. A master node 121_$x$ acts as a master reference time node for its allocated network nodes 122_$x$, and includes a multi frequency (at least dual frequency) GNSS receiver 1201 operatively associated with a GNSS antenna 1211 for receiving navigation signals from any satellites of GNSS satellite system 130 in view of the GNSS antenna 1211, the GNSS receiver being capable of Coarse Acquisition (C/A) code and carrier phase measurements, a master reference clock 1202 giving a reference local time, a communication link 1203 for transmitting and/or receiving data to and from nodes of the network including the control central 110 and the network nodes 122 allocated to that master node 121 and for transferring data between the allocated nodes 122 and the control centre 110, a processor 1204, a monitor 1205 for monitoring environmental conditions of the master node 121_$x$ including a meteo station for monitoring weather conditions, a water vapour radiometer for monitoring the local conditions having an influence on the atmosphere and thus the communication between the GNSS receiver 1201 and the GNSS satellite 130, and an application interface 1206 for interfacing with the local application of the master node requiring synchronisation.

The master reference clock 1202 includes a high stability atomic oscillator 1212 such as a Rubidium clock to which it is locked. The master reference nodes can be equipped with atomic clocks such as rubidium since they are synchronized by SynchroNet with respect to the reference clock 1102 in the control centre and thus do not have the same requirement of level of stability.

Master processor 1204 is configured to select and implement the optimal synchronisation algorithm for synchronising the corresponding allocated network nodes 122_$x$ to the master node 121_x. In some embodiments of the invention the control centre 110 selects the appropriate synchronisation algorithm for synchronising the allocated network nodes 122_x to the master node 121_x. The synchronisation algorithm selected by the respective master node may be one between a common view time transfer (CVTT) and a Linked Common View Time Transfer (LVCTT) using carrier phase or pseudo range measurements. The master processor also has the possibility of applying the multiple-path linked common view time transfer (MLCVTT) with carrier phase or pseudo range measurements. The master node can monitor the status of the network nodes and transfer data representative of the network node status to the control centre 110.

Figure 4:
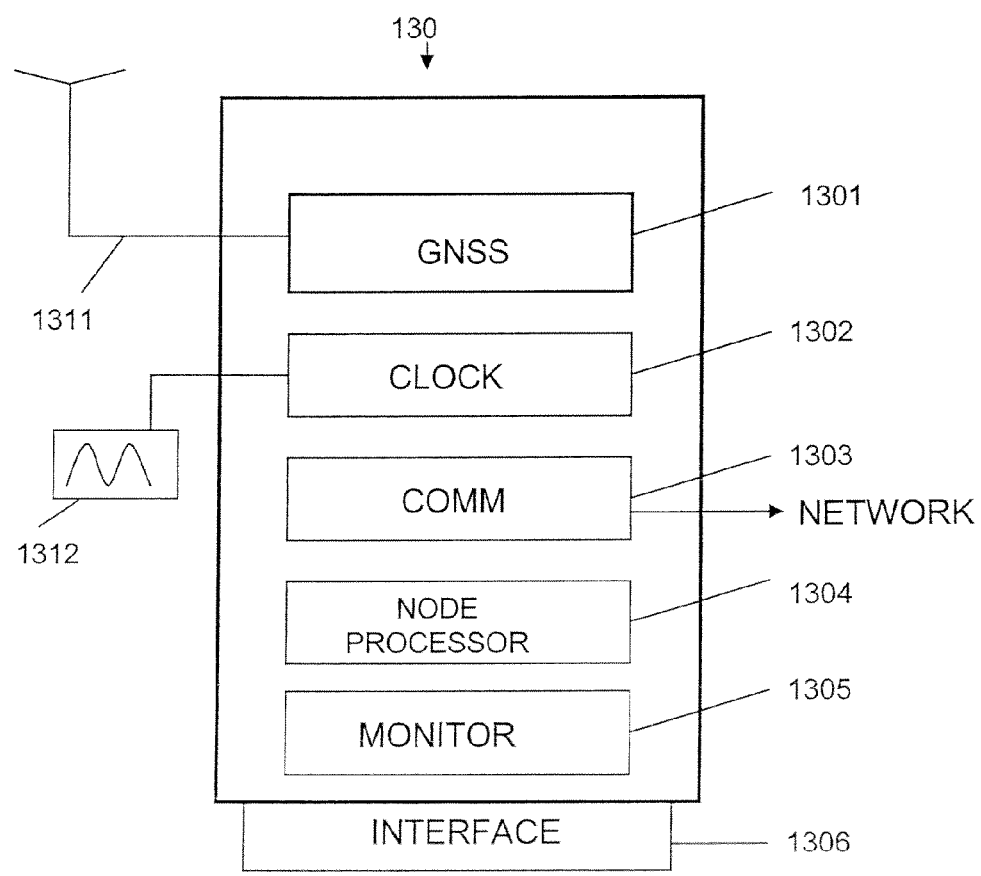
FIG. 4 is a schematic diagram of a network node device according to the first embodiment of the invention.

A network node 122 will now be described in more detail with reference to FIG. 4. A network node includes a multi frequency (at least dual frequency) GNSS receiver 1301 operatively associated with a GNSS antenna 1311 for receiving navigation signals from any satellites of GNSS satellite system 130 in view of the GNSS antenna 1302, the GNSS receiver being capable of Coarse Acquisition (C/A) code and carrier phase measurements, a local reference clock 1302 giving a local node time, a communication link 1303 for transmitting and/or receiving data to and from another node of the network including the master node 121 to which the node is allocated, in some cases the control centre 110, and in some cases other network nodes 122, a processor 1304 and a monitor 1305 for monitoring environmental conditions of the network node 122 including a meteo station for monitoring weather conditions, a water vapour radiometer etc for monitoring the local conditions having an influence on the atmosphere and thus the communication between the GNSS receiver 1301 and the GNSS satellite 130 and an application interface 1306 for interfacing the node to the local application.

The node reference clock 1302 includes a high stability atomic oscillator 1312 such as a Rubidium clock to which it is locked.

Network processor 1304, if the network node is eligible as a master node, is configured to select and implement the optimal synchronisation algorithm, in case of failure of the master node 121 and subsequent election of this network node as new master node 121, for synchronising the network nodes 122 to its reference time The synchronisation algorithm selected by the respective network node 122-x (when elected as new master node 121-x, may be based on a common view time transfer (CVTT) or a Linked Common View Time Transfer (LVCTT) using carrier phase or pseudo range measurements. The network processor also has the possibility of suing multiple-path linked common view time transfer (MLCVTT) with carrier phase or pseudo range measurements.

In the first embodiment of the invention the application to be synchronised is a local area application in which the same satellite of satellite system 130 can be viewed by at least two nodes of the network, and the distance between nodes is <20 km. In further embodiments of the invention the algorithms can be also implemented for regional applications (i.e. nodes baseline of up to 5000 km) providing same results but by applying a LCVTT algorithm instead of CVTT algorithm.

A method of synchronising the nodes of a network according to a first embodiment of the invention will now be described with reference to FIGS. 5A and 5B.

Figure 5A:
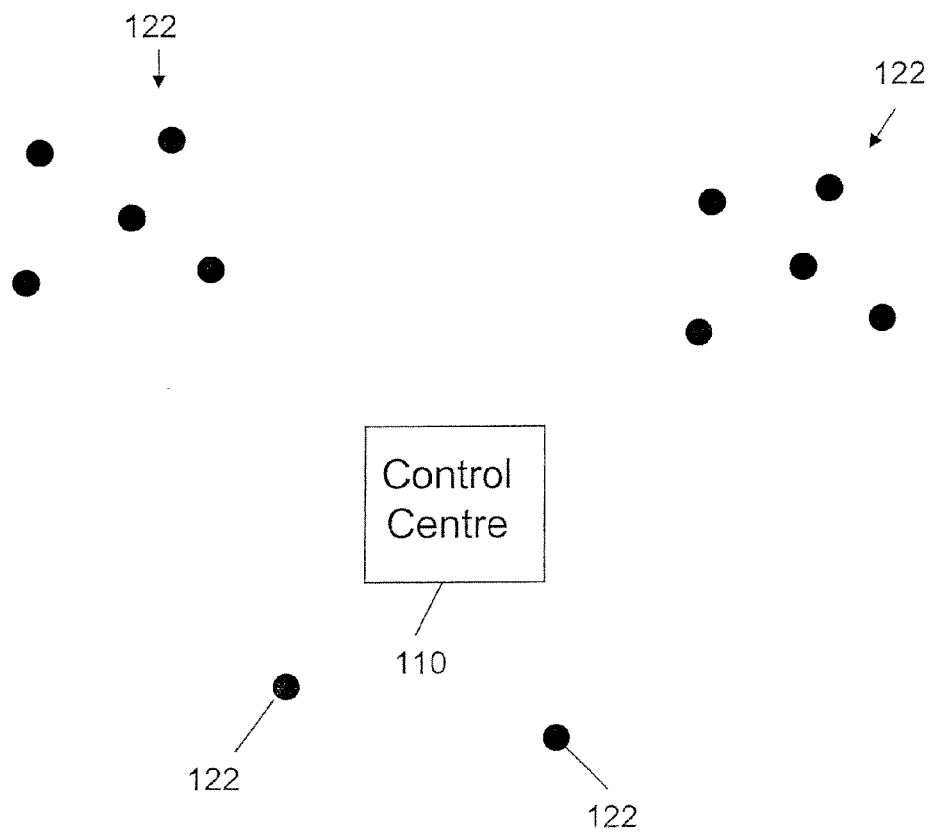
FIGS. 5A and 5B are schematic representations of a method of synchronisation according to the first embodiment of the invention.
Figure 5B:
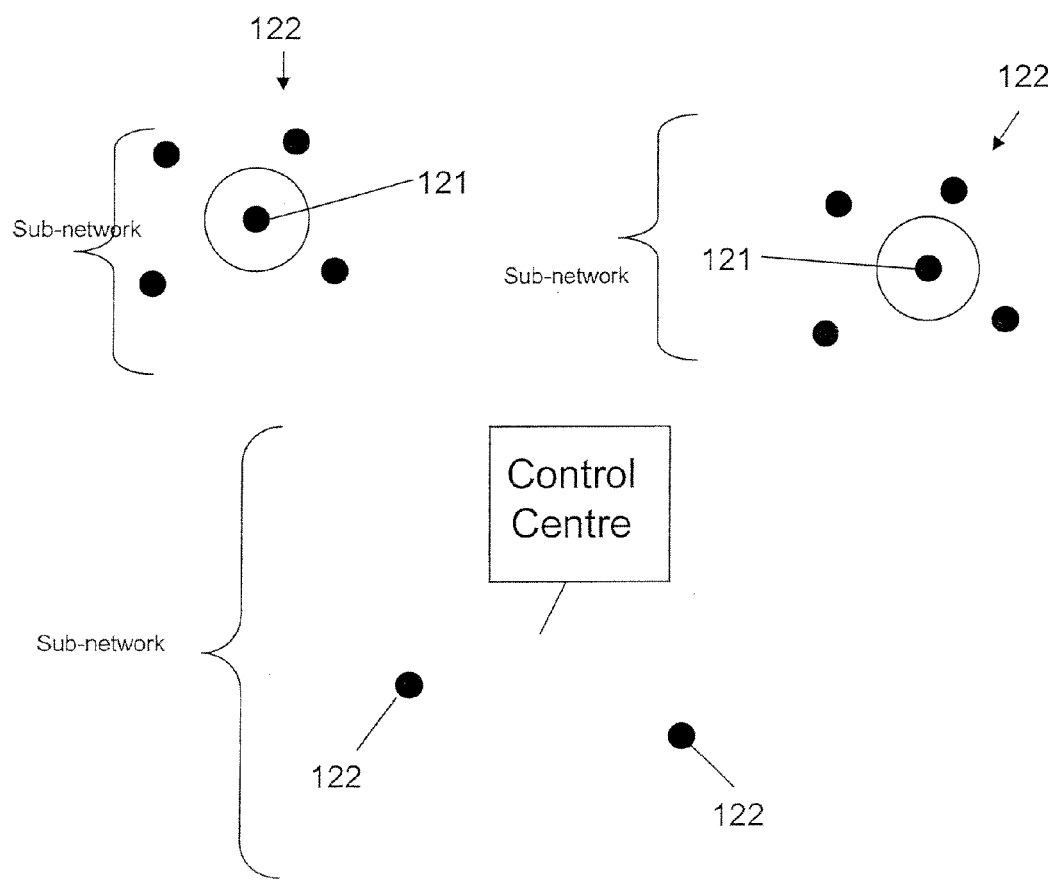

FIGS. 5A and 5B illustrate a number of network nodes 122 to be synchronised to a reference time scale, and a control centre 110 associated with the reference time scale. Each of the network nodes 122 transmits to the control centre 110 positional data representative of its position, the associated observable data, i.e. pseudo range and/or carrier phase measurements, being obtained by the corresponding GNSS receiver 1301, data from its corresponding environmental 1305 monitor and clock node data representative of the status of its local clock 1302.

The control centre 110 processes the data received from each of the nodes and ranks each node according to the performance of its clock 1302, taking into consideration positional data and/or any data from the environmental monitor 1305 indicating conditions of the reception by the corresponding GNSS receiver 1301 of the GNSS satellite system 130. For example, data from a node indicating poor signal reception by that node's GNSS receiver 1301 of the satellite 130 would result in that node having a lower ranking that another node 122 having similar clock node performance but better signal reception conditions. A node having good clock node performance, good satellite reception conditions, further environment monitoring facilities in addition to meteo station, such as for example a electro-magnetic environment monitor and water vapour radiometer, and a central location with respect to other nodes of the network would receive a higher ranking with respect to another node with a poorer clock performance and/or poorer satellite communication conditions.

The control centre 110 selects a number of network nodes from the plurality of network nodes 122 as master nodes 121 according to the node performance ranking—i.e. the higher ranking network nodes are selected. The remaining network nodes are then assigned to a master node 122 or to the central node itself according to the position of the network node 122 relative to the master nodes 121 and the control centre—i.e. a network node 122-x is allocated to its nearest master node 121-x, or if it is located closer to the control centre 110 than to a master node 121-x, then the network node 122-x is allocated to the control centre 110. This process results in the formation of a number of sub-networks within the main network.

Distribution of the network into sub-networks in this way allows the control centre 110 to distribute the synchronisation workload and data load to the master nodes 121.

Further, better synchronisation accuracy can be obtained since for the nodes 122 allocated to a master node the distance between each node and the master node 121 to which it is being synchronised to, is shorter than the distance between that node 122 and the control centre 110 leaving less room for error in the synchronisation algorithm.

Each master node 121 then selects a suitable synchronisation algorithm to synchronise each of its allocated nodes 122_1 to 122_n. In some network configurations master node may need to implement a CVTT algorithm to synchronise one node and a LVTT to synchronise another node of the same sub network. In some embodiments a sub-network is selected in order to better implement the CVTT. LCVTT and MPLCVTT can be selected chosen by the control centre to synchronize the Master nodes to the reference time of the control centre.

The selection of a suitable synchronisation algorithm gives the system flexibility since it may be adapted to any kind of network be it, local, regional or world-wide, since the most appropriate synchronisation algorithm may be selected in each case according to the distance between nodes.

For example, in the present embodiment in which the nodes are to be synchronised for a local area application, the method of common view time transfer (CVTT) may be used to synchronise a node 122_x to its master node 121_x. In time transfer techniques such as CVTT, navigation signals are ideal for time transfer since they are generated from very stable sources and the location of the transmitters is known with a good accuracy.

Figure 6:
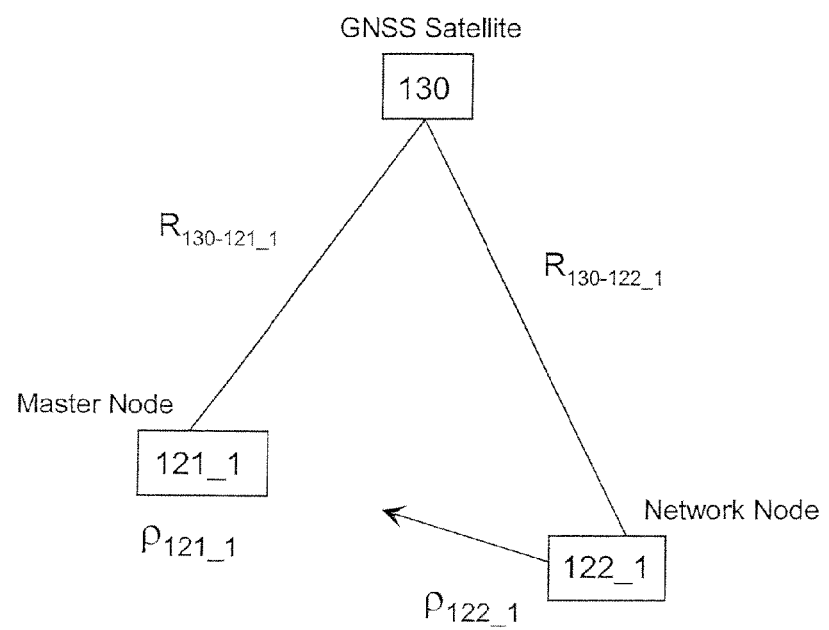
FIG. 6 illustrates the utilisation of a CVTT algorithm in the first embodiment of the invention.

FIG. 6 illustrates a CVTT technique that is based on the measurement data collected by a master node (for example 121_1) and one of its allocated network nodes 122_1 from a GNSS satellite signal, of satellite system 130, transmitted at time $T_{130}$. Each node (master 121_1 or network 122_1) receiver measures the time difference between the reception and the transmission of the satellite signal where $\Delta t_{121}$ represents the time difference with reference to the master node's own local clock 1202, and $\Delta t_{122}$ represents the time difference with respect to the network node's, local clock 1302, respectively. The network node 122_1 sends to the master node 121_1 the measurement data $\rho_{122\_1}$ ($\rho_{122\_1}=\Delta t_{122} \cdot c$ where c is the speed of light) together with the corresponding environmental and positional data. The master node 121_1, then, corrects all the received measurement data taking into account data from the environmental monitor 1205, for its own measurements, and environmental monitor 1305 for the network node measurements, the positional data of itself $R_{130\text{-}121\_1}$ and the network node $R_{130\text{-}122\_1}$ with respect to the GNSS satellite position.

The measurement at the master node clock 1202 of the GNSS satellite 130 signal can then be given as:

$$\rho_{121\_1} = \Delta t_{121} \cdot c = (T_{121} - T_{130}) \cdot c$$

where $T_{121}$ is the time of master node reference clock 1202, $T_{130}$ is the GNSS satellite 130 signal transmission time and $\Delta t_{121}$ represents the propagation delay between satellite 130 and receiver 1201.

Similarly, the measurement at the network node clock 1302 of the GNSS satellite 130 signal can be given as:

$$\rho_{122\_1} = \Delta t_{122} \cdot c = (T_{122} - T_{130}) \cdot c$$

where $T_{122}$ is the time of network node clock 1302, $T_{130}$ is the GNSS satellite 130 signal transmission time and $\Delta t_{122}$ represents the propagation delay between satellite 130 and receiver 1301.

The measurement collected by the GNSS receivers of each node are affected by errors according to:

$$\rho_{122\_1} = R_{130\text{-}122\_1} + \epsilon_{122\_1}^{iono} + \epsilon_{122\_1}^{tropo} + \epsilon_{122\_1}^{mul\text{-}tipath+rx\_noise} + \epsilon^{ephemeris} + \epsilon_{122\_1}^{interference} + \epsilon_{122\_1}^{others}$$

where $R_{130\text{-}122\_1}$ is the geometrical distance between the GNSS satellite 130 and the network node 122_1 receiver and it is known as the slant range.

The processor 1204 of master node 121_1 uses the environmental monitor data to correct the measurement data eliminating the $\epsilon^{iono} + \epsilon^{tropo}$ contribution that are the more important ones. In order to compute the synchronization between the local master reference time of atomic clock 1202 of master node 122_x and the time of atomic clock 1302 of the node 122_1, a subtraction operation between the master node 121_x and the network node 122_x can be calculated as follows:

$$\Delta t_{121} - \Delta t_{122} = ((T_{121}-T_{130})-(T_{122}-T_{130})) \cdot c = T_{121}-T_{122}$$

eliminating satellite time $T_{130}$. This is conceptually how the CVTT works, but operatively it works on the measurements and, considering that $$\Delta t_{122} = \frac{\rho_{122\_1}}{c},$$

the main equation on which the algorithm operates is:

$$\Delta t_{121} - \Delta t_{122} =$$

$$\frac{\rho_{121\_1}}{c} - \frac{\rho_{122\_1}}{c} = = \frac{\left(R_{130\text{-}121\_1} + \varepsilon_{121\_1}^{mp+rx\_n} + \varepsilon_{f}^{fph} + \varepsilon_{121\_1}^{interf} + \varepsilon_{121\_1}^{others}\right) -}{c}$$
$$\frac{\left(R_{130\text{-}122\_1} + \varepsilon_{122\_1}^{mp+rx\_n} + \varepsilon_{f}^{fph} + \varepsilon_{122\_1}^{interf} + \varepsilon_{122\_1}^{others}\right)}{c} = =$$

$$\frac{(R_{130\text{-}121\_1} - R_{130\text{-}122\_1}) + \varepsilon^{residual}}{c}$$

Summarising, the positional data is used to estimate the $R_{130\text{-}12x\_1}$, the environmental data is used to eliminate, as much as possible, the $\epsilon^{iono} + \epsilon^{tropo}$ contribution and the CVTT algorithm is optimized in order to reduce to a minimum the $\epsilon^{residual}$.

The CVTT algorithm can give an accuracy in the range of 1-10 ns. If the distance between the master node 121_1 and the system node 122_1 is small relative to the distance between either node and the satellite the influence of propagation delays becomes more negligible.

This process can be repeated for each satellite in common view of the two nodes with the final time offset being computed as the mean value of offsets computed for each common view satellite. It will also be appreciated that the process can be repeated for a number of satellites in common view of the two nodes but not necessarily all visible satellites—some thresholds or limitation can be considered, for example, for low elevation satellites.

A similar method is then applied to calculate the time interval between the master reference time of master node 121_1 and the reference time of control centre 110. In this way the master node 121_1 and the network node 122_1, synchronised to the master node 121_1, are synchronised to the reference time of the control centre 110.

A similar method can be applied to calculate the time interval between each network node 122 and its corresponding master node 121, the time interval between each master node 121 and the control centre 110, and to calculate the time interval between the network nodes 122_0 allocated to the control centre 110 and the control centre 110. In this way, each of the network nodes 121, 122 is synchronised with respect to the reference time scale of the control centre 110.

Since the synchronisation of the nodes is distributed to sub-networks the data load and computation load at the control centre 110 is reduced and shared with the selected master nodes 121.

The control centre will continue to monitor the status of the nodes at regular intervals, for example in the order of minutes. If for example, the clock 1202 of a selected master node 121_y begins to degrade in performance, that node will no longer be assigned as a master node and another node of the sub network will replace the node as master node. The new node replacing the former master node will be selected according to the node ranking of the nodes of that sub-network.

The configuration or layout/topology of the network may change, for example, if one or more of the network nodes 122_x is mobile and moves away from its assigned master node 121_x and closer to another master node 121_y. In this case, the control centre 110 will reconfigure the network such that the node 122_x is allocated to its nearest master node 121_y. Similarly, a master node 121_x may need to be replaced by another network node 122_x if the master node moves away or its allocated nodes 122 move away and, due to new positional data defining the layout of the network, another node 122 would be more suitable as a master node 121. Further if a master node fails to function it may be replaced by another node of that sub-network, or in some cases another sub network.

Positional data is transferred to the control centre 110 from each of the network nodes 122 and master nodes 121 at different time intervals so that the layout of the network can be reconfigured by the control centre 110.

In this way, the synchronisation method demonstrates robustness and fault tolerance since malfunctioning master nodes can be replaced dynamically.

After the synchronisation phase, the application to be synchronised can be launched. Communication between nodes can be encrypted to provide security. Double key signature systems may also be used to secure the application.

Figure 7:
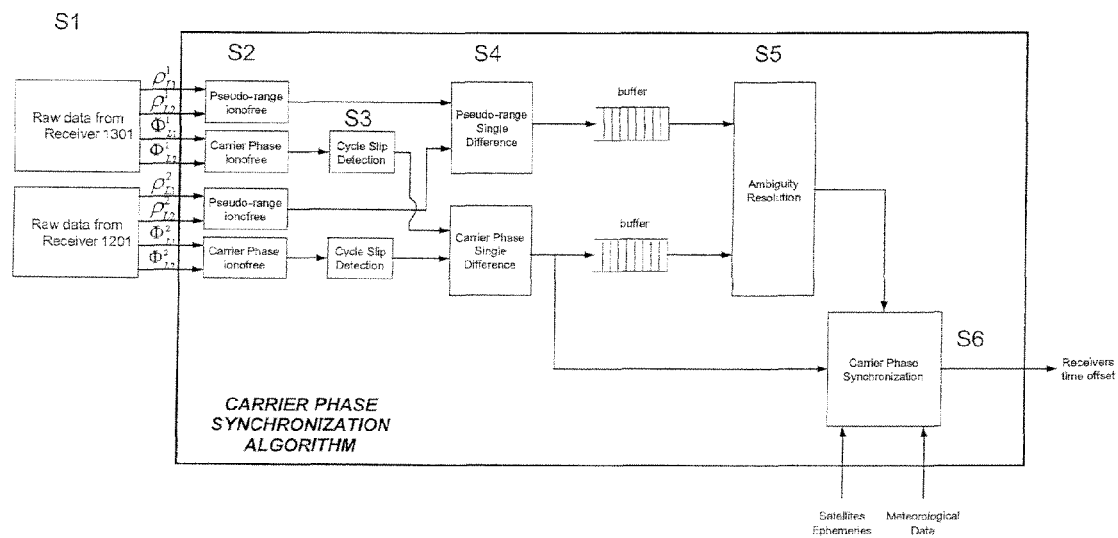
FIG. 7 is a schematic representation of a method of synchronisation according to a further embodiment of the invention.

A further embodiment of the invention will be described with reference to FIG. 7. In the further embodiment the time delay between a network node 122 and its corresponding master node 121 may be determined by applying a carrier phase based algorithm.

Carrier phase measurements $\phi$ (expressed in cycles of the carrier) can be modelled as:

$$\Phi = \frac{\rho_{slant-range}}{\lambda} + c\frac{\Delta t_{RX} - \Delta t_{SV}}{\lambda} - c\frac{\Delta t_I}{\lambda} + c\frac{\Delta t_T}{\lambda} + c\frac{\Delta t_M^p}{\lambda} + N + \eta^p$$

where $\rho_{slant-range}$ is the true distance between a network node receiver 1301, or a master node receiver 1201, and the phase center of the satellite 130 transmitting antenna, $\Delta t_{RX}$ and $\Delta t_{SV}$ are node receiver and satellite clock bias, respectively, $\Delta t_I$ and $\Delta t_T$ are the ionospheric and tropospheric delays, $\Delta t_M^p$ is the delay due to the multipath and $\eta^p$ is the receiver noise on carrier phase measurements and N is an unknown integer ambiguity of wavelength. The negative sign of the ionospheric propagation term, which in this embodiment accounts for a phase advance, is due to the fact that, in a dispersive medium, the product of the phase and group velocities for an electromagnetic wave is $c^2$, and therefore the phase travels at a speed higher than the speed of light.

By inspection of the previous equation, it will be noted that by performing a subtraction between two observations of the same satellite 130 taken by two receiver nodes, a network node receiver 1301 and the receiver 1201 of its corresponding master node 121, at the ends of an arbitrary baseline will remove the terms which are dependent upon the individual satellite 130. We may thereby form a first difference of phase and write:

$$\Delta\Phi_i = \frac{\Delta\rho_i}{\lambda} + c\frac{\Delta\tau}{\lambda} - c\frac{\delta I}{\lambda} + c\frac{\delta T}{\lambda} + c\frac{\delta M}{\lambda} + N_i + \eta$$

where $\Delta\rho_i$ is the difference between the satellite 130 and master node receiver 1201 distance, and the satellite 130 and network node receiver 1202 distance, $\Delta\tau$ is the synchronization term between the two receivers 1201 and 1202, $\delta I$, $\delta T$ and $\delta M$ are the ionosphere, tropospheric and multipath residual delays not cancelled out after differentiation and $N_i$ is the difference between integer ambiguities affecting receivers.

For a short baseline distance the $\delta I$ and $\delta T$ terms can be neglected since ionospheric and tropospheric delay are the same for both receivers. If the receiver's positions is precisely known, and if an ambiguity resolution technique is used, synchronization offset between the remote receivers can be computed:

$$\Delta\tau = \frac{\lambda\Delta\Phi_i - \Delta\rho_i - \lambda N_i}{c} + err$$

Where the err term represents the unmodeled errors.

For a long baseline distance the $\delta I$ and $\delta T$ terms cannot be neglected. Models to estimate ionospheric and tropospheric delay should thus be foreseen in the synchronization algorithm.

Using a double frequency approach, it is possible to remove the ionospheric contribution. For the particular case of GPS, the carrier frequencies are in the L-band, precisely at 1575 MHz (L1) and 1227.6 MHz (L2), corresponding to a wavelength $\lambda 1$, $\lambda 2$ of ≈19 and 24 cm respectively. The combination (difference) of carrier phase measurements at these frequencies produces an additional fictitious signal characterized by an equivalent wavelength of ≈86 cm and free from ionosphere contributions. This can be used beneficially to resolve the ambiguity and it is known as the "wide lane" technique for ambiguity resolution.

The benefit of the iono-free combination is that a large systematic error may be eliminated. However, the single frequency approach is preferred for a short baseline application (for example in the order of 100-200 km), since the ionospheric contribution can be considered equal at the receivers of the two nodes and then eliminated by the first difference approach.

By letting $\gamma$ be $(L1/L2)^2$ than it is possible to combine the double frequency code and phase measurements to compute iono-free measurements, i.e. measurements independent of ionosphere conditions:

$$\rho_{iono-free} = \frac{\rho_{L2} - \gamma\rho_{L1}}{1 - \gamma}$$

$$\Phi_{iono-free} = \frac{\gamma}{\gamma - 1}\lambda_{L1}\Phi_{L1} - \frac{1}{\gamma(\gamma - 1)}\lambda_{L2}\Phi_{L2}$$

As previously mentioned, the Carrier Phase Synchronization Algorithm requires processing for ambiguity resolution. The ambiguity can be estimated and removed from carrier phase measurements since it produces a N$\lambda$(m) error on the synchronization. For a time transfer application the ambiguity that should be estimated is the $N_i$ ($=N_1-N_2$) term difference between the two receivers ambiguities.

An initial estimate of the ambiguity can be found by performing subtraction on code and phase single difference measurements taken at the same instant for the same satellite of satellite system 130. This initial estimate is not necessarily correct, due to the various error contributions, but it provides a suitable starting point for a local search. Since ambiguity is an integer value, errors in its estimation produce errors in the synchronization multiple of the wavelength. In the case of iono-free combination, the synchronization error can be a multiple of 0.86 m.

To mitigate this problem it is possible to choose an interval time so that the ambiguity resolution algorithm can process all contiguous measurements taken in the considered time slot. Using this approach the algorithm allows a stable ambiguity resolution.

For timing applications, the constraint related to a fixed baseline, in which the distance between the system node 122 and the corresponding master node does not change, mitigates somewhat the problem, since the ambiguity can be, in principle, resolved once. However, cycle slips due to the receiver, sudden ionospheric disturbances (scintillations) or phase slips in the satellite transmitting equipment requires a continuous monitoring of the ambiguity to avoid errors that will appear in the solution. To avoid errors due to cycle slip before the ambiguity resolution algorithm a Cycle Slip Detection algorithm should be foreseen.

This process can be repeated for each satellite in Common Visibility between the two receivers. The final time offset can be computed as mean value of the synchronizations computed for each satellite in common view of the two nodes.

The resolution in the carrier phase measurements is related to the received signal power, the thermal noise, the noise figure of the corresponding antenna and the receiver, the bandwidth of the carrier phase locked loop in the receiver and the frequency stability of the local oscillator. Accounting for all these parameters, a typical modern receiver is capable of recovering the carrier phase with a ≈5 mm (root mean square) noise superimposed, mainly due to thermal noise.

By virtue of the low carrier phase measurements the development of synchronization techniques based on the phase of the carrier provides the capability of delivering time-transfer capabilities at tens of picosecond level for continental baseline (1000-4000 Km).

The carrier phase algorithm described in this embodiment can enable an entire network of receivers to be accurately synchronized. In fact it can be used in place of the code-based CV synchronization algorithm in a LCVTT algorithm.

In alternative embodiments of the invention, for regional applications, for example in which the network spans over distances of in a range of 300-5000 km, a linked common view time transfer (LCVTT) technique can be used to determine the time offset between nodes of the network. In this technique the common view time transfer technique can be optimised by means of adjacent (linked) synchronisation in which the common view time transfer technique is applied between one node and different adjacent nodes of the network to determine time offsets.

Using the Common-View Technique, provided there are enough satellites in common-view visibility between pair of network node stations, a number of sensor node stations can be linked by implementation of a LCVTT (linked common view time transfer) technique, to provide the time offset between individual pairs of station node clocks as well as the time offset between nodes at remote sites not in common view.

Figure 8:
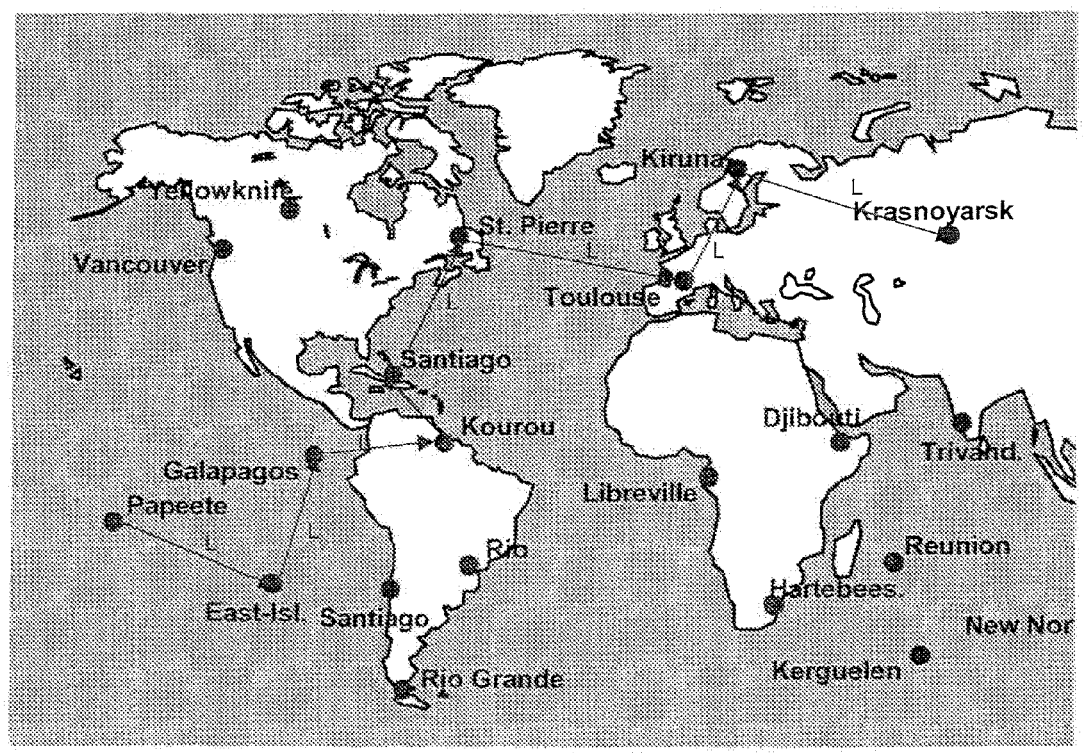
FIG. 8 illustrates the utilization of a LCVTT algorithm according to an embodiment of the invention.

The situation is shown in FIG. 8, where only a few links are shown so as not to unnecessarily clutter the picture. The LCVTT not only allows the time offset between adjacent stations to be determined, but by taking multiple differences also the time offset between non adjacent stations to be measured, for instance, between Papeete and Kransoyarsk for the links shown.

The LCVTT technique alone, although simple and computationally efficient, suffers several disadvantages. One of the main drawbacks is that when using linked common view techniques, a single noisy site may reduce the precision of synchronization.

Figure 9:
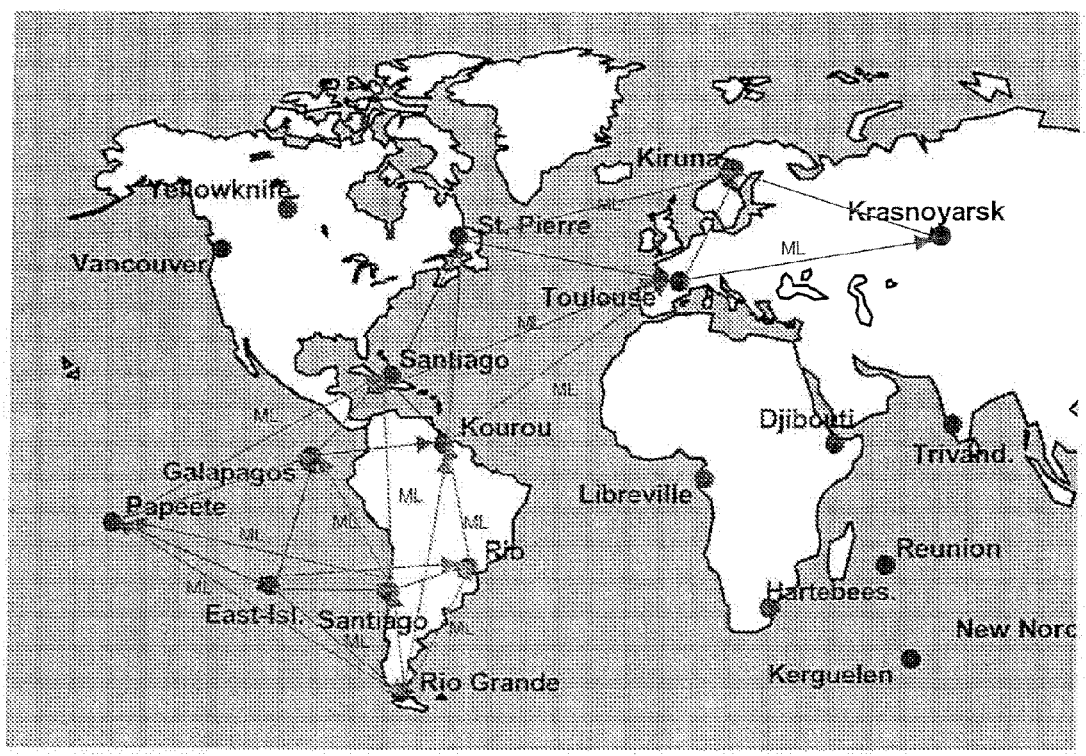
FIG. 9 illustrates the utilization of an MPLCVTT algorithm according to an embodiment of the invention.

In even further embodiments of the invention, an improvement of this technique can be obtained by synchronizing two remote node stations using a multiple-path linked common view time transfer (MPLCVTT) approach. In fact many possible path links exist between two stations placed far apart and not sharing common visibility, as depicted in FIG. 9. In order to increase the amount of data available, and therefore increase the precision of the synchronization, one can use as many path links as possible. By providing multiple independent measurements that can be averaged the noise measurement can be reduced. This approach is statistically more robust than the single linked common-view.

It will also be appreciated that in some embodiments of the invention a combination of the different techniques described above may be used to determine the offsets between system/network nodes and master nodes, master nodes and the control centre, system nodes and the control centre depending on the distance between the nodes involved.

In alternative embodiments of the invention the following may be used as synchronization techniques for one or more of the system nodes:

Two-Way Time and Frequency Transfer via Satellite, improved versions (frequency: 1E-14 within 100 s, time stability: 30 ps, time accuracy: 300 ps . . . 1 ns)

Time Dissemination via geo-synchronous satellites, incl. EGNOS (dedicated services)

Time Dissemination via geo-synchronous satellites (embedded service within digital data streams)

Time dissemination via LEO satellite communication systems

Time dissemination via GEO satellite communication systems

GTS: Global Time System, fully funded, to be operated on-board the ISS, start 2001 (dedicated service), accuracy: 10 µs . . . 1 ms ACES (Atomic Clock Ensemble in Space), Real-time common-view GPS (0.1 . . . 3 ns)

Advanced optical links

Although, the method and system of the first embodiment of the invention has been described in relation to GPS satellite systems, it will be appreciated that the method can be applied also Galileo, GLONASS or COMPASS satellite systems with the nodes being provided with receivers adapted to receive signals from these satellite systems. For examples the receivers may be triple/multiple frequency receivers.

Although the present invention has been described hereinabove with reference to specific embodiments, the present invention is not limited to the specific embodiments, and modifications will be apparent to a skilled person in the art which lie within the scope of the present invention.

The invention claimed is:

1. A method of synchronising a plurality of nodes of a network to a reference time of a control centre, the method comprising:

receiving, at the control centre, measurement data from each of the plurality of nodes;

ranking, at the control centre, the plurality of nodes with respect to one another according to the measurement data;

selecting, at the control centre, one or more master nodes from the plurality of nodes according to the ranking, at least one of the one or more master nodes being different from the control centre;

assigning, at the control centre, each of the plurality of nodes to a corresponding master node;

determining a first time offset between the local time measured at each node and the local time measured at its corresponding master node;

determining a second time offset between the local time measured at each of the one or more master nodes and the reference time of the control centre; and determining the time offset between the local time measured at each node and the reference time of the control centre based on the first time offset and the second time offset.

2. A method according to claim 1 wherein the measurement data comprises positional data representative of the geographical position of the corresponding node.

3. A method according to claim 2, further comprising determining the geographical distribution of the nodes according to the positional data and wherein each of the plurality of nodes is assigned to a corresponding master node according to the position of a node relative to the position of a master node.

4. A method according to claim 2, wherein updated positional information is received from the nodes of the network and a master node is selected from a plurality of nodes according to the updated positional information.

5. A method according to claim 1, wherein the measurement data comprises performance data representative of the performance of the corresponding node.

6. A method according to claim 5, wherein the performance data comprises clock performance data representative of the performance of the clock of the corresponding node.

7. A method according to claim 5, wherein updated performance data is received from each node in order to rerank the nodes according to performance of the node and to select a node as a master node according to the ranking.

8. A method according to claim 1, wherein the measurement data comprises environmental data representative of the local environment of the corresponding node.

9. A method according to claim 1, wherein the first time offset and/or the second timeset is determined by applying an algorithm selected from the group consisting of common view time transfer, linked common view time transfer, and multiple path linked common view time transfer algorithms.

10. A method according to claim 9, wherein a synchronisation algorithm is selected by each master node or the control centre according to the position of the network node with respect to the corresponding master node or the control centre.

11. A method according to claim 1, wherein at least one of a first time offset and a second time offset is determined by applying a carrier phase based algorithm.

12. A method according to claim 1, wherein assigning, at the control centre, each of the plurality of nodes to the corresponding master node comprises assigning, at the control centre, each of the plurality of nodes that are not master nodes to the corresponding master node.

13. A synchronisation device of a control centre for synchronising a plurality of nodes of a network with a reference time, the device comprising:
- a global navigation satellite systems receiver operatively associated with a global navigation satellite systems antenna;
- a time source giving local time;
- data communication means for receiving data from and transmitting data to one or more of the nodes;
- ranking means operable to rank the nodes with respect to one another according to the measurement data transmitted by the nodes;
- selection means operable to select one or more master nodes from the plurality of nodes according to the ranking of the nodes, at least one of the one or more master nodes being different from the control centre;
- assigning means operable to assign each of the plurality of nodes to a corresponding master node; and
- time offset determination means operable to determine:
    - a first time offset between the local time measured at each node and the local time measured at its corresponding master node,
    - a second time offset between the local time measured at each of the one or more master nodes and the reference time scale of the control centre,
    - the time offset between the local time measured at each node and the reference time of the control centre based on the first time offset and the second time offset.

14. A synchronisation system for synchronising a plurality of nodes of a network with a reference time, comprising a synchronisation device of a control centre according to claim 13 and a plurality of network nodes, the network nodes each being equipped with a global navigation satellite systems receiver and a local timing source.

* * * * *